(12) United States Patent
Meunier et al.

(10) Patent No.: US 8,821,951 B2
(45) Date of Patent: Sep. 2, 2014

(54) METHOD OF SINTERING A COMPOSITION

(75) Inventors: Vincent Daniel Maurice Meunier, Epalinges (CH); Markus Hubert Hartmann, Radolfzell (DE); Daniel Johannes Dopfer, Bretigny-sur-Morrens (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/880,311

(22) PCT Filed: Oct. 19, 2011

(86) PCT No.: PCT/EP2011/068218
§ 371 (c)(1),
(2), (4) Date: Apr. 18, 2013

(87) PCT Pub. No.: WO2012/052457
PCT Pub. Date: Apr. 26, 2012

(65) Prior Publication Data
US 2013/0209632 A1 Aug. 15, 2013

(30) Foreign Application Priority Data
Oct. 19, 2010 (EP) .................................... 10188053

(51) Int. Cl.
*A23P 1/02* (2006.01)
*A23C 1/00* (2006.01)
*A23L 2/39* (2006.01)
*A23F 5/40* (2006.01)
*A23F 5/38* (2006.01)
*A23C 11/00* (2006.01)
*A23C 9/18* (2006.01)

(52) U.S. Cl.
CPC ... *A23P 1/02* (2013.01); *A23F 5/40* (2013.01); *A23F 5/38* (2013.01); *A23C 11/00* (2013.01); *A23V 2002/00* (2013.01); *A23C 9/18* (2013.01); *A23C 2260/20* (2013.01)
USPC ............ 426/285; 426/588; 426/593; 426/596

(58) Field of Classification Search
USPC ........................................................ 426/285
See application file for complete search history.

(56) References Cited

U.S. PATENT DOCUMENTS

| 4,031,238 | A | | 6/1977 | Reid et al. | |
|---|---|---|---|---|---|
| 5,786,017 | A | * | 7/1998 | Blake et al. | 426/534 |
| 2007/0212476 | A1 | * | 9/2007 | Destephen et al. | 426/660 |
| 2007/0286937 | A1 | * | 12/2007 | Baechler et al. | 426/588 |
| 2009/0312281 | A1 | * | 12/2009 | Buisson et al. | 514/53 |

FOREIGN PATENT DOCUMENTS

| EP | 0373697 | 6/1990 |
|---|---|---|
| EP | 1632135 | 3/2006 |
| EP | 1721528 | 11/2006 |
| GB | 772315 | 4/1957 |
| WO | 02/062152 | 8/2002 |
| WO | 2006/005525 | 1/2006 |
| WO | 2008/113778 | 9/2008 |
| WO | 2010/112359 | 10/2010 |
| WO | 2010/115697 | 10/2010 |

OTHER PUBLICATIONS

Foster, K. 2006. Journal of Food Engineering 77:997.*
Fitzpatrick, J. 2010. Powder Technology 204:131.*
Fabra, M. et al. 2011 Journal of Food Engineering 103(1)47.*
Mosquera, L. 2010. Journal of Food Engineering 97(1)72.*
Sillick, M. et al. 2010. Carbohydrate Polymers 79(4)1028.*
Tonon, R. et al. 2009. Journal of Food Engineering 94(3-4)215.*
International Search Report and Written Opinion issued Feb. 17, 2012 for corresponding Intl. Appln. PCT/EP2011/068218.

* cited by examiner

*Primary Examiner* — Carolyn Paden
(74) *Attorney, Agent, or Firm* — K&L Gates LLP

(57) ABSTRACT

The present invention relates to a method of sintering at least two powdered compounds with different water activities and glass transition temperatures keeping the total water content constant. The method allows sintering of two materials in a closed environment wherein the structure of one material is kept intact.

10 Claims, No Drawings

METHOD OF SINTERING A COMPOSITION

CROSS REFERENCE TO RELATED APPLICATIONS

The present application is a National Stage of International Application No. PCT/EP2011/068218, filed on Oct. 19, 2011, which claims priority to European Patent Application No. 10188053.2, filed Oct. 19, 2010, the entire contents of which are being incorporated herein by reference.

FIELD OF THE INVENTION

The present invention relates to a method of sintering at least two powdered compounds with different water activities and glass transition temperatures keeping the total water content constant.

BACKGROUND

Many dry food and beverage products are produced and sold as powders to be reconstituted, e.g. by dissolution in water or milk, before consumption, e.g. soluble coffee, coffee creamers, soups, bouillons and milk products, and the like. There is a desire to present these in novel formats to the consumer, as well as providing formats which enables easy and reproducible dosing of the product when reconstituting it. Solid shapes such as tablets are known in the art and may be produced by compaction of a powdered material. Tablets are often very compact in structure and have poor dissolution properties. In some products an internal porosity is desired, e.g. to improve dissolution and/or to allow for the production of a foam when the product is dissolved in liquid. Compaction will usually destroy such a porous internal structure. Solid shapes may also be produced by sintering wherein humidity is applied and powdered ingredients are brought above their glass transition temperature to produce binding between the powder particles. Drawbacks of this technology is e.g. the need to dry the sintered material after sintering to remove excess humidity to ensure stability, collapse of internal structure, loss of aroma, and/or unwanted chemical reactions, due to heating above the glass transition temperature.

SUMMARY OF THE INVENTION

The inventors have found that solid shapes of powdered materials can be produced from a mixture of at least two different powders differing with regard to water activity and glass transition temperature, without the addition of humidity and subsequent drying, and wherein the physical structure of at least one of the powdered ingredients is conserved. Accordingly, the present invention relates to a method of sintering a composition comprising two powdered components, wherein the water activity of the first powdered component is higher than the water activity of the second powdered component, and the glass transition temperature of the first powdered component is lower than the glass transition temperature of the second powdered component; the method comprising heat treating a mixture of the two powdered components at a temperature which is above the glass transition temperature of the first powdered component and less than 20° C. above the glass transition temperature of the second powdered component; and wherein the total water content of the mixture is kept constant during the heat treatment.

DETAILED DESCRIPTION OF THE INVENTION

The method of the present invention involves sintering of a mixture of at least two powdered components. The two components differ as to their water activities and glass transition temperatures. The first powdered component functions as a binder during the sintering process when it is heated to a temperature above its glass transition temperature, whereas the second powdered component remains, largely, intact as the heating is performed at a temperature less than 20° C. above the glass transition temperature of this component. By less than 20° C. above the glass transition temperature of the second component is meant that the treatment temperature is lower than the glass transition temperature of the second component plus 20° C., it thus includes temperatures below the glass transition temperature of the second powdered component. In a preferred embodiment of the invention, heating is performed at a temperature less than 20° C. above the glass transition temperature of the second powdered component, such as less than 10° C. or less than 5° C. above the glass transition temperature of the second powdered component. The glass transition temperature and the water activity are related such that increasing the water activity leads to a lower glass transition temperature. Since the sintering is performed under conditions wherein the total water content of the mixture is kept constant, it is possible to determine suitable values for the water activity for both powdered components based on the desired final water content and a suitable treatment temperature. During and after the sintering process water will diffuse from the component with the highest water activity to the component with lower water activity to produce a sintered material with a homogenous water activity. The at least two powdered components are preferably water-soluble, and preferably in an amorphous state.

Suitable food materials for use as the at least two powdered ingredients include e.g. vegetable extracts, e.g. coffee or tea extracts; yeast extracts; meat extracts; hydrolysed meat and/or fish proteins; meat powders; vegetable powders, e.g. tomato powder and onion powder; cereal flours, e.g. wheat flour; hydrolysed plant proteins; maltodextrins; sugar syrups; dextrose; urea; organic acids such as e.g. citric acid; spray-dried dairy powders; brown sugar; and mixtures thereof.

The glass transition temperature may be determined by Differential Scanning Calorimetry (DSC) by methods well known in the art. The glass transition temperature ($T_g$) can be expressed vs. the water content of the product using the Gordon & Taylor equation (Gordon, M., & Taylor, J. S. (1952). Ideal copolymers and second-order transitions in synthetic rubbers. I. Non-crystalline polymers. Journal of Applied Chemistry, 2, 493-500):

$$T_g = \frac{Q_c T_{g,c} + k_{GT} Q_w T_{g,w}}{Q_c + k_{GT} Q_w}$$

wherein
$Q_w$=Water content in wet basis [0-1]
$Q_c=(1-Q_w)$
$T_{g,w}=-135°$ C.
$k_{GT}$=G&T equation constant The relationship between water content and water activity can be expressed using the sorption isotherm equation after the BET and GAB models (Stephen Brunauer, P. H. Emmett, Edward Teller (1938) Adsorption of gases in multimolecular layers. J. Am. Chem. Soc., 60 (2), pp 309-319) with K=1:

$$\frac{Q_w^{db}}{100} = \frac{Q_m C K a_w}{(1-Ka_w)[1-Ka_w(1-C)]}$$

or $$a_w = \frac{Q_w^{db}(C-2) - Q_mC + \sqrt{C(Q_w^{db2}C + 2Q_w^{db}Q_m(2-C) + CQ_m^2)}}{2KQ_w^{db}(C-1)}$$

wherein
$Q_w^{db}$=Water content in dry basis [0-1]
$a_w$: Water activity
$Q_m$: Water monolayer value constant
C, K: Fiting constants
and $$Q_w^{db} = \left(\frac{Q_w}{1-Q_w}\right)$$

By combining these two models the relationship between glass transition temperature and water activity can be expressed.

The water activities of the first and second powdered components are preferably selected so that both components will have a glass transition temperature above the storage temperature of the product at the water activity reached after equilibration, to ensure physical robustness of the final product.

The first powdered component may preferably comprise maltodextrin, coffee extract, tomato powder, and/or onion powder. If the first powdered component comprises maltodextrin, it preferably has a dextrose equivalent value (DE) of between about 10 and about 50. Maltodextrins are usually produced by the hydrolysis of starches, and DE is a measure of the percentage of reducing sugars in the product. DE describes the degree of conversion of starch into glucose and a DE value of 100 corresponds to complete conversion into glucose.

The glass transition temperature and the water activity of the first powdered component may be chosen depending on the kind of materials to be used, the desired treatment temperature and the desired water activity of the final product. The glass transition temperature of the first powdered component may preferably be in the range of between 10° C. and 50° C., such as between 15° C. and 40° C. The water activity of the first powdered component may preferably be in the range of between 0.2 and 0.8, such as between 0.3 and 0.6.

The second powdered component may preferably be selected among milk powder, such as e.g. skim milk powder or whole milk powder; soluble coffee powder; coffee creamer, e.g. non-dairy coffee creamer; starch; maltodextrin; flour, e.g. wheat flour; and mixtures thereof. The glass transition temperature and the water activity of the second powdered component may be chosen depending on the kind of materials to be used, the desired treatment temperature and the desired water activity of the final product. The glass transition temperature of the second powdered component may preferably be above 40° C., such as above 50° C., or above 60° C. The water activity of the second powdered component may preferably be in the range of between 0.01 and 0.4, such as between 0.05 and 0.2. The second powdered component may e.g. be a component with an internal structure that it is desired to retain in the final product. By heat treating the mixture at a temperature and time ensuring that no sintering of the second powdered components takes place, it can be ensured that the physical structure of the particles is left completely or partially intact. The method of the invention can thus be used to provide sintered materials wherein one or more powdered components retain their physical structure. This may e.g. be useful if the sintered material is to be used for forming foam upon dissolution, in this case a porous component containing gas may be used. It may also be useful to ensure that flavours; nutritional components, e.g. minerals and/or vitamins; enzymes; microorganisms; oils; and mixtures thereof; which are comprised in, e.g. entrapped in, the second powdered component will remain intact and/or will not be released during the sintering process. In one embodiment the mixture to be sintered comprises a foam boosting agent, e.g. a powder of particles comprising entrapped gas, preferably gas entrapped under pressure, e.g. a powder as disclosed in WO 01/08504 (Société des Produits Nestlé S.A.).

In another embodiment a mixture to be sintered comprises a porous soluble coffee powder, preferably a coffee powder suited for producing a foam upon dissolution in an aqueous liquid, e.g. a coffee powder as disclosed in WO 2009/040249 (Nestec S.A.) or WO 2009/080596 (Nestec S.A.).

If the internal powder structure of the second powdered component is to remain intact, it is preferable that the glass transition temperature of the second powdered component at the water activity reached during equilibration of the water content between the ingredients during and/or after the heat treatment is above the temperature of the heat treatment. In this way it is assured that the second component will not be treated at a temperature above its glass transition temperature at any point. Accordingly, in one embodiment of the invention, a mixture of the two powdered components is heat treated at a temperature which is less than 5° C. above the glass transition temperature of the second powdered component at the water activity reached after full equilibration of the water activity of all ingredients of the mixture being treated. In a preferred embodiment, a mixture of the two powdered components is heat treated at a temperature which is below the glass transition temperature of the second powdered component at the water activity reached after full equilibration of the water activity of all ingredients of the mixture being treated.

In one embodiment, the mixture of the two powdered components is heated to a temperature which is below the glass transition temperature of the first powdered component at the water activity reached after full equilibration of the water activities of all ingredients of the mixture being treated. In this way the sintering process becomes self-stopping. During sintering water will be transferred from the first powdered component to the second powdered component resulting in a gradual increase in glass transition temperature of the first powdered component. When the glass transition temperature of the first powdered component increases above the treatment temperature, sintering will stop.

The water activity of the powdered components of the mixture may be controlled in any suitable manner, e.g. the components may be produced by a method yielding the desired water activity, or water may be added or removed by any suitable means. A powdered component may e.g. be placed under a controlled atmosphere with the humidity required to achieve the desired water activity of the component, or a component may be subjected to drying. The glass transition temperature of a powdered component is affected by changes in water activity, but may also be controlled by adjusting the chemical composition of the powdered component.

The composition of the invention may comprise further ingredients depending on the nature and desired characteristics of the final product. If the final product is a food or beverage product, the composition may contain ingredients such as e.g. sweeteners, e.g. sugar; colorants; flavour; aroma; vitamins; minerals; bulking agents; salts; emulsifiers; stabilisers; and combinations thereof. Specifically, the composition may comprise additional ingredients that will not take part in the sintering process and thus remain intact in the final product, e.g. ingredients in crystalline form, e.g. sugars, and/or encapsulated ingredients such as encapsulated aroma; encapsulated nutrients, e.g. vitamins and/or minerals; and/or encapsulated bioactive ingredients, e.g. enzymes and/or microorganisms.

According to the method of the invention a mixture of the two powdered components is heated to a temperature which is above the glass transition temperature of the first powdered component. Hereby is meant that the maximum average temperature of the mixture reached during the heat treatment is above the glass transition temperature of the first powdered component. The temperature to which the mixture is heated is less than 20° C. above the glass transition temperature of the second powdered component. Hereby is meant that the maximum average temperature of the mixture reached during the heat treatment is less than 20° C. above the glass transition temperature of the second powdered component. The heat treatment is preferably performed so that the second powdered component is not sintered. To achieve this, the treatment temperature may depend on the time of treatment. For short treatment, a high temperature may be chosen whereas for longer treatments a lower temperature may be chosen, depending on the properties of the materials to be sintered. Some materials may be heated somewhat above their glass transition temperature for some time before any sintering takes place, while for other materials sintering will start almost immediately when the glass transition temperature is exceeded. In a preferred embodiment the temperature is below the glass transition temperature of the second powdered component. The sintered mixture is preferably not dried after sintering.

The total water content of the mixture is kept constant during the heat treatment. This is preferably achieved by performing the heat treatment with the mixture in a closed environment. The closed environment may e.g. be a closed mould or the like. Preferably, the mixture is heat treated in the closed packaging in which it will subsequently be stored, transported and/or sold. The mixture may e.g. be heat treated in a blister packaging, sachet, pouch, bag, or any other suitable closed packaging. The packaging is preferably impermeable to water. The total water content of the mixture is kept constant meaning that no substantial amount of water is lost to the environment. If the heat treatment is performed in a closed environment, a minor amount of water may evaporate to the atmosphere within the closed environment. If the heat treatment is performed in the packaging in which the product will subsequently be stored, transported and/or sold, the total amount of water within the packaging remains constant. In a preferred embodiment less than 5% water (weight/weight), such as less than 2%, or more preferably less than 1% of water is lost to the environment.

In one embodiment the method of the invention is a method for preparing a solid sintered creamer material. By a creamer material is understood a material useful for adding to a beverage, e.g. a coffee, cocoa or tea beverage, to whiten the beverage, add flavour to the beverage, and/or to produce a foam in the beverage. Creamer materials in liquid or powder form is well known in the art. A creamer material may comprise dairy ingredients such as milk fat, and milk protein, e.g. casein, caseinate, whey protein, whey protein isolate, and/or whey protein concentrate. A creamer material may be a non-dairy creamer comprising non-dairy ingredients such as e.g. vegetable fat, e.g. soybean oil, coconut oil, palm oil, palm kernel oil, corn oil, cotton seed oil, canola oil, olive oil, sunflower oil, safflower oil, and/or blends thereof; and/or vegetable protein. A creamer material further often comprises sugar, e.g. sucrose and/or maltodextrin; emulsifiers; stabilisers; flavours; and/or buffer salts. When preparing a sintered creamer material, the first powdered component may e.g. be maltodextrin, and the second powdered component may e.g. be a dried powdered emulsion of fat, protein, emulsifier, and/or buffering salt.

In another embodiment the method of the invention is a method for preparing a solid sintered coffee mix material. By a coffee mix material is meant a material useful for the preparation of a coffee beverage comprising soluble coffee and additional ingredients, e.g. coffee creamer and/or sugar. Such materials are well known in the art in powdered form. When preparing a sintered coffee mix material, the first powdered component may e.g. be maltodextrin, and the second powdered component may e.g. be a creamer material, e.g. a dried powdered emulsion of fat, protein, emulsifier, and/or buffering salt. Soluble coffee will often form part of the second powdered component, but may also form part of the first powdered component.

In a further embodiment the method of the invention is a method for preparing a solid sintered coffee material. A solid sintered coffee material may be prepared from powdered soluble coffee, e.g. by using two powdered soluble coffee components differing in water activity and glass transition temperature as the first and second powdered components of the method of the invention. Preferably, two powdered soluble coffee components may be produced from the same, or similar, coffee extract, but differ in water activity and thus in glass transition temperature. Methods of producing powdered soluble coffee components are well known in the art.

EXAMPLES

Example 1

Solid Milk Powder/Maltodextrin Mixture

Skim milk powder was treated in a closed dessicator with a saturated salt solution to produce a controlled humidity in the head space, to produce a skim milk powder with a water content of 2.67% (weight/weight) and a water activity ($a_w$) of 0.113 as measured with a rotronic Hygrolab device. The glass transition temperature was 67.2° C. as measured with DSC.

Powdered maltodextrin with DE of 40 was treated in a closed dessicator with a saturated salt solution to produce a controlled humidity in the head space, to produce a maltodextrin powder with a water content of 7.24% (weight/weight) and a water activity ($a_w$) of 0.432. The glass transition temperature was 21.3° C.

A mixture of 75% (weight/weight) treated skim milk powder and 25% treated maltodextrin was filled into plastic blister packaging which was sealed air- and watertight. Filled packs were heated at 55° C. for 60 minutes in an oven, other packs where heated in a microwave oven for 5, 10, or 20 seconds to exceed the glass transition temperature of the maltodextrin. In all cases solid sintered shapes were formed.

The final product in the pack reached a calculated equilibrium water activity of 0.197, with a water content of 4.03% and glass transition temperature of 52.9° C. for the skim milk powder part, and water content of 3.09% and glass transition temperature of 56.6° C. for the maltodextrin part.

Example 2

Coffee Mix Material

Skim milk powder was treated as in example 1 yielding a similar material as in example 1.

Non-dairy creamer (52% corn syrup maltodextrin, 48% vegetable fat) was in a closed dessicator with a saturated salt solution, to produce a controlled humidity in the head space, to produce a powder with a water content of 3.65% (weight/weight) and a water activity ($a_w$) of 0.432. The glass transition temperature was 35.3° C.

Soluble coffee was in a closed dessicator with a saturated salt solution, to produce a controlled humidity in the head space, to produce a coffee powder with a water content of 2.34% (weight/weight) and a water activity ($a_w$) of 0.113. The glass transition temperature was 65.4° C.

A mixture of 16% (weight/weight) treated skim milk powder, 28% treated non-dairy creamer, 15% treated soluble coffee, and 41% sucrose was filled into plastic blister packaging which was sealed air- and watertight. Filled packs were heated at 65° C. for 60 minutes in an oven, other packs where heated in a microwave oven for 5, 10, or 20 seconds to exceed the glass transition temperature of the non-dairy creamer. In all cases solid sintered shapes were formed.

The final product in the pack reached a calculated equilibrium water activity of 0.211, with a water content of 4.24% and glass transition temperature of 50.8° C. for the skim milk powder part, water content of 1.85% and glass transition temperature of 69.1° C. for the maltodextrin part, and water content of 3.94% and glass transition temperature of 46.3° C. for the soluble coffee part.

Example 3

Foaming Coffee Mix Material

Theoretical Example

Skim milk powder and maltodextrin is treated like in example 1 yielding similar materials as in example 1.

An agglomerated porous foaming soluble coffee powder as disclosed in WO 2009/080596 (Nestec S.A.) is treated as in example 2 to produce a coffee powder with a water content of 2.07% (weight/weight), water activity ($a_w$) of 0.113, and glass transition temperature of 70.1° C.

A foaming agent in the form of a powder comprising a matrix of protein and carbohydrate with entrapped gas under pressure is produced as disclosed in WO 01/08504 (Société des Produits Nestlé S.A.), with a water content of 1.82%, water activity of 0.050, and glass transition temperature of 81.1° C.

A mixture of 45% (weight/weight) treated skim milk powder, 25% treated maltodextrin, 15% treated soluble coffee, and 15% foaming agent is filled into blister packs which are sealed air- and watertight. Filled packs are heated at 55° C. for 60 minutes in an oven, or in a microwave oven for 5, 10, or 20 seconds.

The final product in the pack reaches a calculated equilibrium water activity of 0.187, with a water content of 3.88% and glass transition temperature of 54.4° C. for the skim milk powder part, water content of 2.93% and glass transition temperature of 58.2° C. for the maltodextrin part, water content of 4.10% and glass transition temperature of 54.4° C. for the foaming agent part and water content of 3.22% and glass transition temperature of 55.9° C. for the soluble coffee part.

Example 4

Solid Milk Powder/Maltodextrin Mixture

Theoretical Example

Whole milk powder is treated to produce a whole milk powder with a water content of 2.11% (weight/weight) and a water activity ($a_w$) of 0.113 The glass transition temperature is 64.1° C.

Powdered maltodextrin with DE of 29 is treated to produce a maltodextrin powder with a water content of 7.03% (weight/weight) and a water activity ($a_w$) of 0.432. The glass transition temperature is 35.6° C.

A mixture of 75% (weight/weight) treated whole milk powder and 25% treated maltodextrin is filled into blister packs which are sealed air- and watertight. Filled packs are heated at 65° C. for 60 minutes in an oven.

The final product in the pack reaches a calculated equilibrium water activity of 0.205, with a water content of 3.27% and glass transition temperature of 47.8° C. for the whole milk powder part, and water content of 3.53% and glass transition temperature of 71.4° C. for the maltodextrin part.

Example 5

Foaming Coffee Mix Material

Theoretical Example

Skim milk powder and maltodextrin is treated like in example 1 yielding similar materials as in example 1.

An agglomerated porous foaming soluble coffee powder as disclosed in WO 2009/080596 (Nestec S.A.) is treated as in example 2 to produce a coffee powder with a water content of 2.07% (weight/weight), water activity ($a_w$) of 0.113, and glass transition temperature of 70.1° C.

A mixture of 60% (weight/weight) treated skim milk powder, 25% treated maltodextrin, and 15% treated soluble coffee, is filled into blister packs which are sealed air- and watertight. Filled packs are heated at 55° C. for 60 minutes in an oven.

The final product in the pack reaches a calculated equilibrium water activity of 0.198, with a water content of 4.04% and glass transition temperature of 52.8° C. for the skim milk powder part, water content of 3.10% and glass transition temperature of 56.5° C. for the maltodextrin part, and water content of 3.38% and glass transition temperature of 54.0° C. for the soluble coffee part.

Example 6

Tomato Powder Mix

Theoretical Example

Tomato powder is treated in a closed desiccator with a saturated salt solution to produce a controlled humidity in the head space, to produce a tomato powder with a water content of 4.85% (weight/weight) and a water activity (aw) of 0.230. The glass transition temperature is 8.3° C.

A starch is treated in a vacuum chamber to produce a starch with a water content of 3.36% (weight/weight), water activity (aw) of 0.030 and glass transition temperature above 100° C.

A mixture of 72.22% (weight/weight) treated tomato powder, 16.67% treated starch, 11.11% sodium chloride is filled into blister packs which are sealed air- and watertight. Filled packs are heated at 60° C. for 60 minutes in an oven, or in a microwave oven for 5, 10, or 20 seconds.

The final product in the pack reaches a calculated equilibrium water activity of 0.179, with a water content of 3.74% and glass transition temperature of 15.7° C. for the tomato powder part and water content of 8.03% and glass transition temperature of above 100° C. for the starch part.

Example 7

Onion Powder Mix

Theoretical Example

Onion powder is treated in a climatic chamber, to produce an onion powder with a water content of 6.56% (weight/weight) and water activity (aw) of 0.300. The glass transition temperature is 41.0° C.

A starch is treated in a vacuum chamber to produce a starch with a water content of 3.36% (weight/weight), water activity (aw) of 0.030 and glass transition temperature above 100° C.

A mixture of 10.00% (weight/weight) treated onion powder, 3.33% treated starch and 86.67% sodium chloride is filled into blister packs which are sealed air- and watertight. Filled packs are heated at 65° C. for 60 minutes in an oven.

The final product in the pack reaches a calculated equilibrium water activity of 0.191, with a water content of 4.97% and glass transition temperature of 55.4° C. for the onion powder part and water content of 8.21% and glass transition temperature above 100° C. for the starch part.

Example 8

Solid Milk Powder Tablet

A coffee creamer was prepared with the following composition (all amounts in % weight/weight):

| | |
|---|---|
| Corn syrup DE28 | 46.8% |
| Vegetable fat | 43.5% |
| Sodium Caseinate | 3% |
| Buffer salts | 3% |
| Emulsifier | 0.6% |
| Water | 3.1% |

The creamer had a water activity of 0.180.

Two portions of the creamer were humidified to increase the water activity to 0.337 and 0.387, respectively.

Two powder mixes were produced by mixing each of the humidified creamer portions with a similar portion of original creamer. The powder mixes were individually filled into moulds which were sealed to keep water content constant, and treated by microwave heating to obtain a temperature approximately 20° C. above the glass transition temperature of the humidified component. Samples were cooled and left for 3 days. Both powder mixes produced sintered tablets with good stability and dissolution properties. Details are given below:

Sample 1:
  Water activity of original creamer: 0.180
  Glass transition temperature of original creamer: 75° C.
  Water activity of humidified creamer: 0.337
  Glass transition temperature of humidified creamer: 50° C.
  Water activity of mixture: 0.260
  Glass transition temperature of mixture: 62° C.
  Treatment temperature: 70° C.

Sample 2:
  Water activity of original creamer: 0.180
  Glass transition temperature of original creamer: 75° C.
  Water activity of humidified creamer: 0.387
  Glass transition temperature of humidified creamer: 43° C.
  Water activity of mixture: 0.288
  Glass transition temperature of mixture: 57° C.
  Treatment temperature: 63° C.

The invention claimed is:

1. A method of sintering a composition comprising two powdered components, wherein the water activity of the first powdered component is greater than the water activity of the second powdered component, and the glass transition temperature of the first powdered component is less than the glass transition temperature of the second powdered component, the method comprising: heat treating a mixture of the two powdered components at a temperature which is above the glass transition temperature of the first powdered component and less than 20° C. above the glass transition temperature of the second powdered component; and maintaining the total water content of the mixture constant during the heat treatment.

2. The method of claim 1 wherein the mixture of the two powdered components is heated to a temperature which is below the glass transition temperature of the second powdered component.

3. The method of claim 1 wherein the mixture of the two powdered components is heated to a temperature which is at least 10° C. above the glass transition temperature of the first powdered component.

4. The method of claim 1 wherein the mixture of the two powdered components is heated to a temperature which is less than 5° C. above the glass transition temperature of the second powdered component at the water activity reached after full equilibration of the water activities of all ingredients of the mixture being treated.

5. The method of claim 1 wherein the mixture of the two powdered components is heated to a temperature which is below the glass transition temperature of the first powdered component at the water activity reached after full equilibration of the water activities of all ingredients of the mixture being treated.

6. The method of claim 1 wherein the first and the second powdered components are water soluble.

7. The method of claim 1 wherein the first powdered component comprises maltodextrin.

8. The method of claim 1 wherein the second powdered component comprises milk powder.

9. The method of claim 1 wherein the second powdered component comprises soluble coffee.

10. The method of claim 1 wherein the mixture of the two powdered components is heated to a temperature between 45° C. and 75° C.

* * * * *